Figure 1:
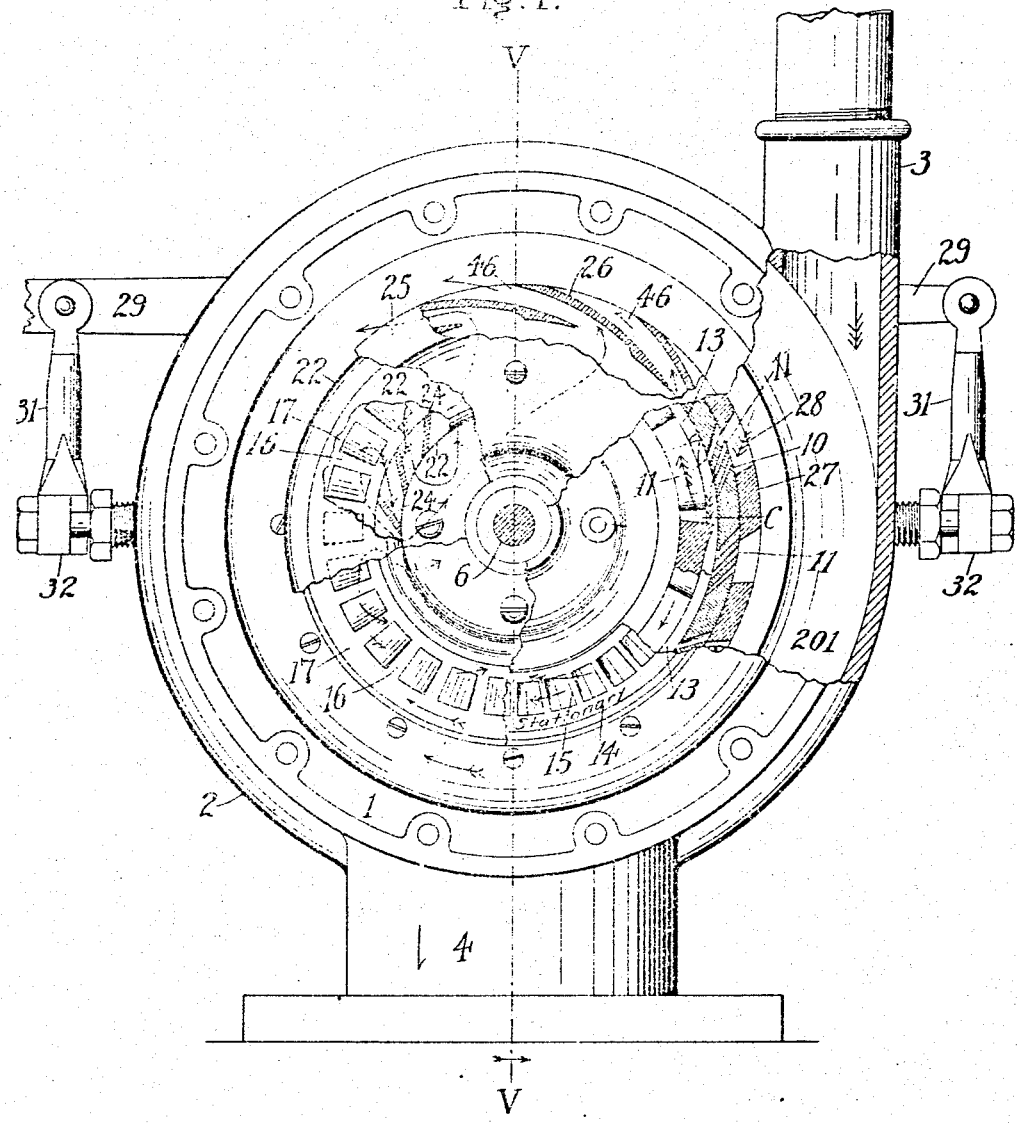

S. T. HOLLY.
ROTARY MOTOR.
APPLICATION FILED MAR. 11, 1901. RENEWED JAN. 4, 1906.

931,872.

Patented Aug. 24, 1909.
6 SHEETS—SHEET 1.

WITNESSES

INVENTOR
Solomon Townsend Holly
by Townsend Bros
his atty

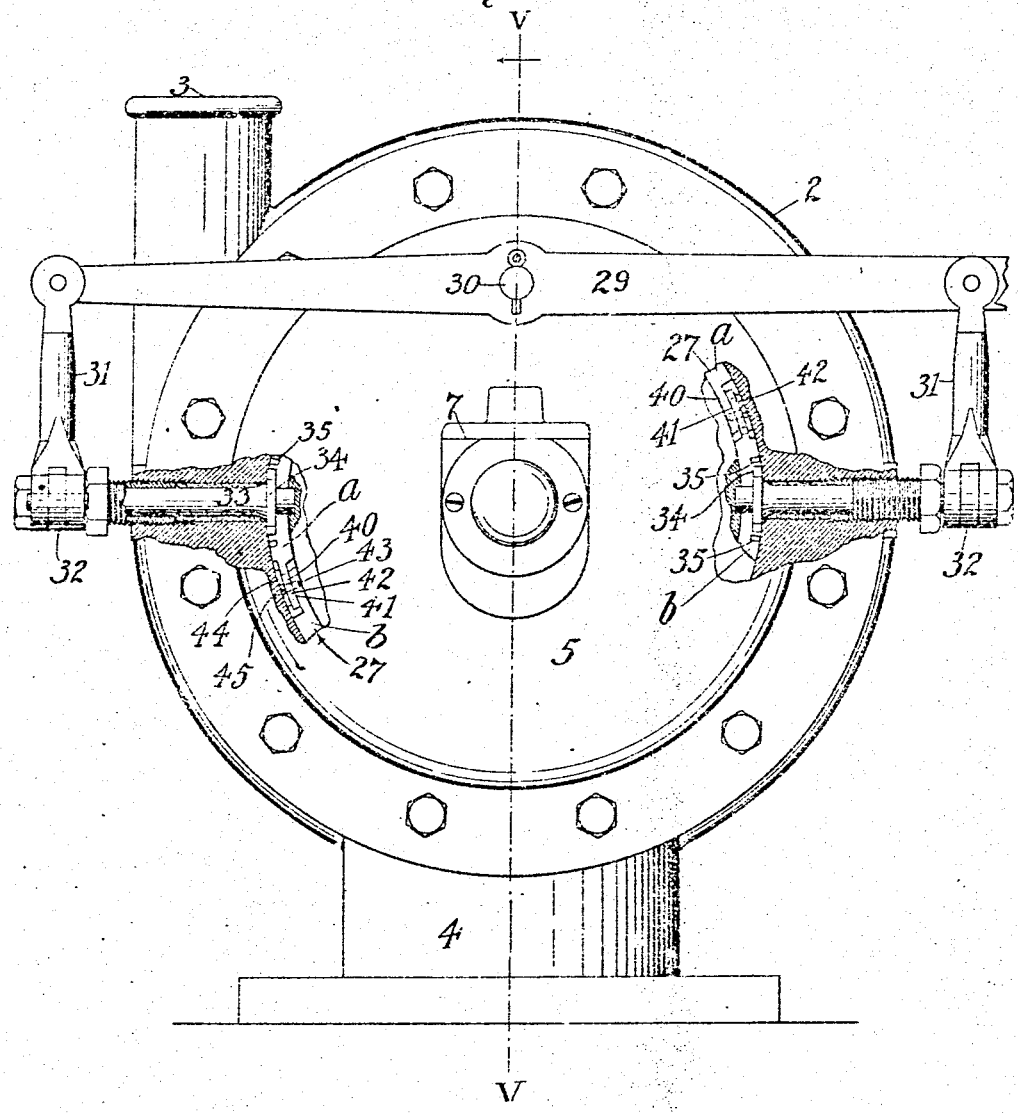

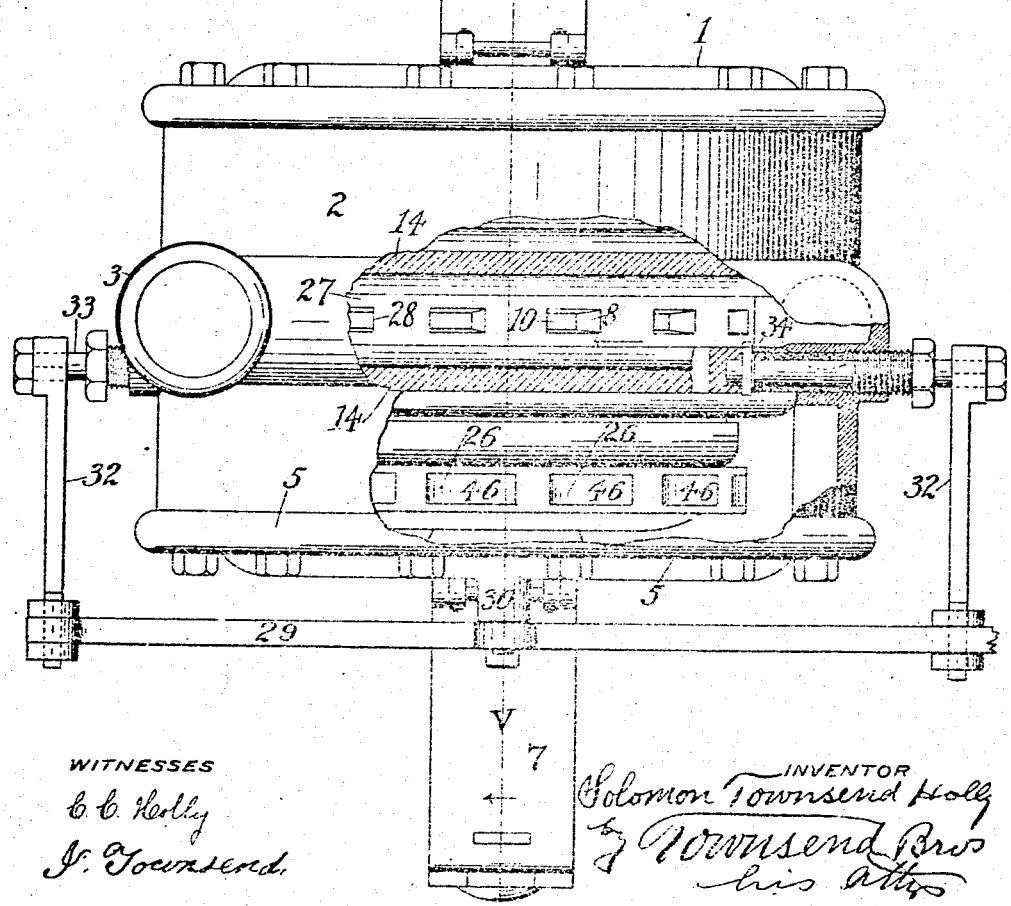

S. T. HOLLY.
ROTARY MOTOR.
APPLICATION FILED MAR. 11, 1901. RENEWED JAN. 4, 1906.
931,872.
Patented Aug. 24, 1909.
6 SHEETS—SHEET 4.
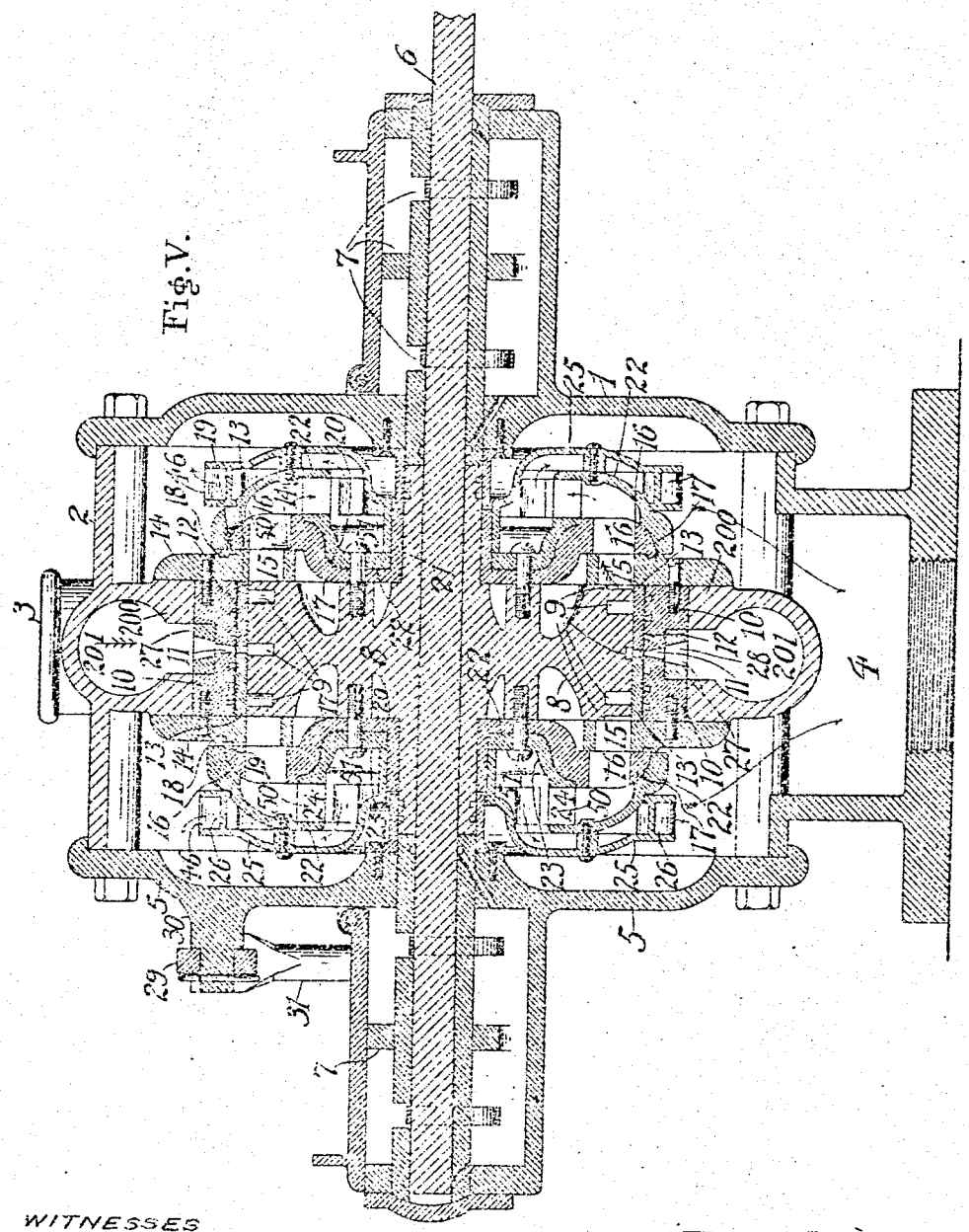
Fig. V.
WITNESSES
C. C. Holly.
J. Townsend,
INVENTOR
Solomon Townsend Holly
by Townsend Bros
his attys.

S. T. HOLLY.
ROTARY MOTOR.
APPLICATION FILED MAR. 11, 1901. RENEWED JAN. 4, 1906.
931,872.
Patented Aug. 24, 1909.
6 SHEETS—SHEET 5.
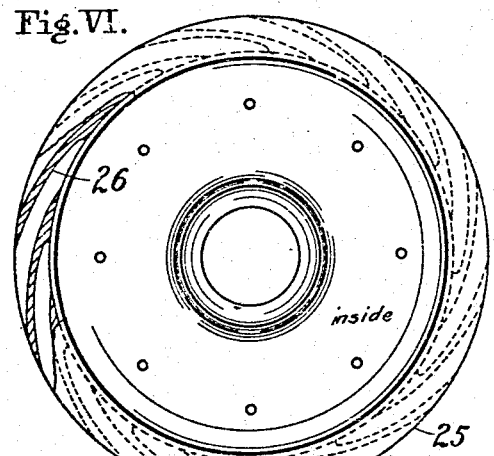
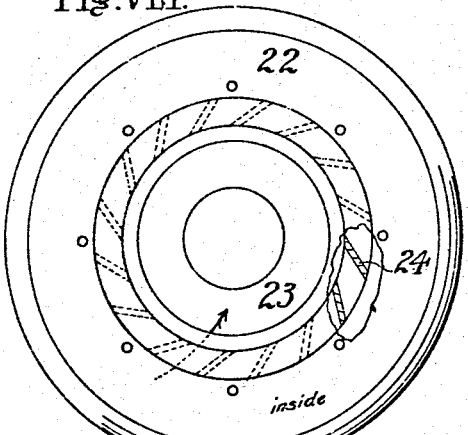
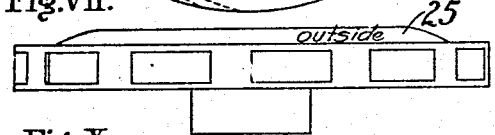
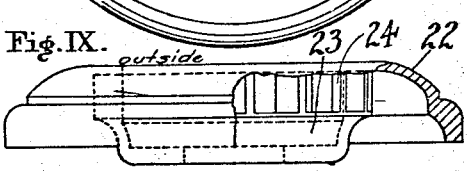
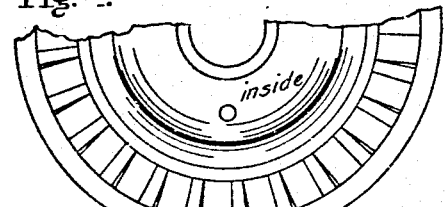
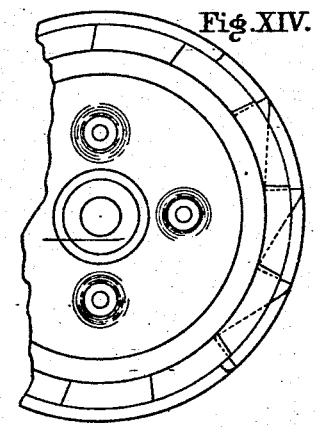
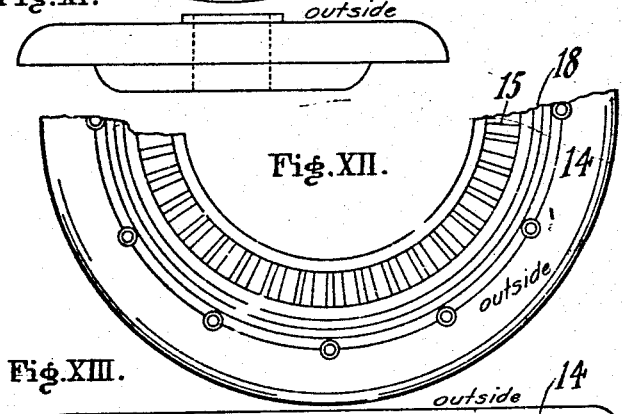
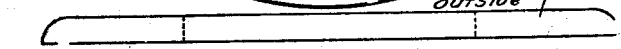

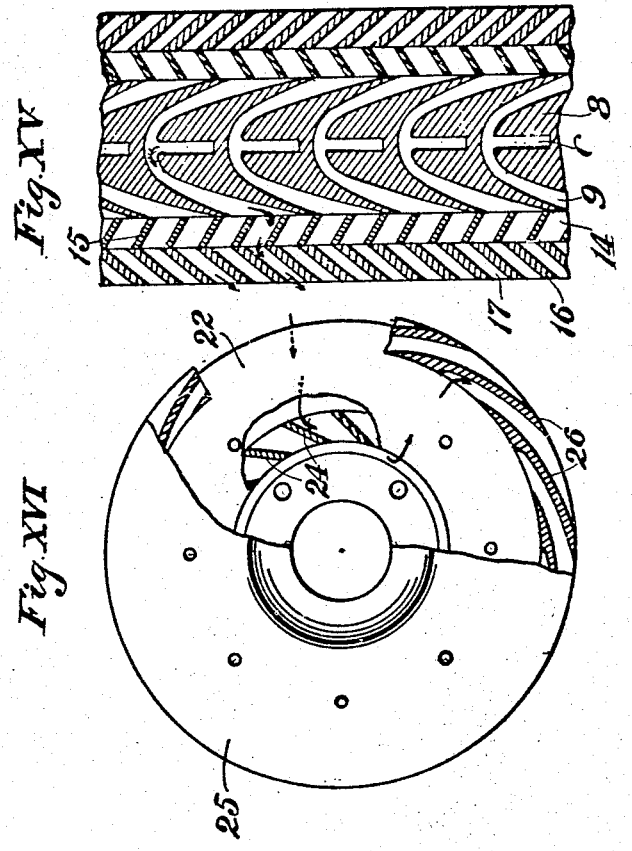

UNITED STATES PATENT OFFICE.

SOLOMON TOWNSEND HOLLY, OF LOS ANGELES, CALIFORNIA, ASSIGNOR OF ONE-FOURTH TO LUTHER M. MARSTON, ONE-FOURTH TO ANNA MAY MARSTON, AND ONE-FOURTH TO CARRIE C. HOLLY, ALL OF LOS ANGELES, CALIFORNIA.

ROTARY MOTOR.

931,872.      Specification of Letters Patent.      Patented Aug. 24, 1909.

Application filed March 11, 1901, Serial No. 50,739. Renewed January 4, 1906. Serial No. 294,644.

*To all whom it may concern:*

Be it known that I, SOLOMON TOWNSEND HOLLY, a citizen of the United States, residing at Los Angeles, in the county of Los Angeles and State of California, have invented a new and useful Rotary Motor, of which the following is a specification.

This invention relates to engines or motors, and particularly to that class thereof known as turbine rotary-motors; and some of the objects of the invention are to provide an engine or motor of this character capable of running at a high rate of speed; and to provide compounding attachments adapted to increase the power. That is to say, by this invention I produce a turbine rotary-engine of great torque, by means of which high steam pressures can be utilized economically, and without an excessively high rotary speed of the power-shaft.

Another object of the invention is to provide such a motor having a piston requiring no packing, and running without contact with the stationary parts of the apparatus.

It is also an object of the invention to produce a motor or engine having a stationary part provided with annular grooves, for the reception of the actuating medium, thereby forming a packing between that part and the piston.

A further object of the invention is to provide a device for regulating simultaneously the inlet of the actuating medium to the piston; and to afford means to provide for the enlargement of that device when necessary by reason of the expansion of the parts by heating.

Still another object of the invention is to provide frusto-conical inlet-ports, arranged in groups, each of which has ports of various sizes.

Furthermore, an object of this invention is to provide a piston constructed of less expansible material than the adjacent parts, to prevent friction between the parts by reason of the greater liability of the piston to expansion by heating; and also to provide compounding devices to utilize all of the potency in the actuating medium.

With these, and other objects in view, the invention consists essentially in the construction, combination and arrangement of parts substantially as hereinafter more fully described in the following specification, and illustrated in the accompanying drawings, forming part of this application, in which—

Figure I is an end elevational view, partly broken away and partly in section, of a rotary-engine or motor embodying the invention. The end-disk or back-head of the engine is omitted from this view. Fig. II is a similar view, partially broken away, of the opposite end thereof. The end-disk or head of the engine is shown partly broken away. Fig. III is a top plan view, partly broken away and partly in section. Fig. IV is a detail view, showing, in developed plan, a portion of the periphery of the piston, with the peripheral bands partly broken away. Fig. V is a central section taken on line V—V Figs. I, II and III, looking toward the feed-pipe or induction-inlet or nozzle. Fig. VI is a view of the inside face of one of the outer compounding-disks. Fig. VII is an edge view of said outer compounding-disk detached. Fig. VIII is a view of the inside face of one of the intermediate compounding-disks. Fig. IX is an edge view of said intermediate compounding-disks partially in section to show interior construction. Fig. X is a fragmental view of the inside face of one of the inner compounding-disks. Fig. XI is an edge view of said inner compounding-disk. Fig. XII is a fragmental view of the outer face of one of the directing-rings. Fig. XIII is an edge view of said ring. Fig. XIV is a fragmental detail of the end of the piston. Fig. XV is a sectional development of portion of the piston and the adjacent series of guide-vanes. Fig. XVI is a side view of the piston, partly broken away to show the guide-vanes.

Similar characters of reference designate corresponding parts throughout the several views.

Referring to the drawings, the reference character 1 designates the end-disk or back-head of a rotary motor or engine, which may be removably secured to the cylindrical casing 2 by bolts or screws and the casing is preferably provided with a tangential feed-pipe, inlet, or induction-nozzle 3 and with an exhaust-outlet or eduction-outlet 4 of any preferred construction, and an end-disk or front-head 5 is similarly secured upon the other side of the casing 2 as shown.

Mounted in bearings formed in the front and back heads 5 and 1, is a shaft 6 preferably of as slight diameter as is consistent with ample strength, and desirably provided with long bearings in order to diminish friction; and an oiling-device is also provided for the shaft 6 substantially as detailed at 7 in Fig. V of the drawings.

The rotary part which receives the impulse of the impelling medium and transmits the same to the power-shaft 6, consists of a mid-piston proper and a greater or less number of disks fastened to the opposite ends of the piston proper and forming compounding extensions thereof. The disks which occupy corresponding positions at the opposite ends of the piston proper are complementary to each other, but are otherwise alike. That is to say, a cross-section at the mid-length of the piston would separate it and its attached parts into two complementary halves. The torque of the engine is increased by addition to the compounding-disks; and the action of the steam upon the halves of the piston and the compounding-disks is equally disposed upon the opposite sides of the middle of the piston so that there is no end thrust upon the power-shaft 6.

Referring particularly to Fig. V, the reference character 8 designates a piston suitably secured upon the shaft 6 and preferably provided with peripheral buckets 9, Figs. IV, V, and IX, desirably parabolic in form and enlarged toward their outlets. Said buckets may be cast or cut in the piston, and open laterally at the opposite ends of the piston, while the inlets to the buckets lie in a plane intermediate of the periphery of the piston as shown in Figs. IV and V of the drawings.

I will now particularly describe the construction of the engine by referring to the parts in the singular number, it being understood that the same character is applied indiscriminately to both of the corresponding parts which lie on opposite sides of the middle of the piston.

Within the casing 2 and encircling the piston 8 is a stationary ring 10, Figs. I and V, preferably provided with frusto-conical inlet-ports 11 desirably arranged in groups of three; the ports of each group being of varying sizes and also disposed tangentially to the periphery of the piston 8 so as to allow the steam or other impelling fluid to pass therethrough directly into the buckets 9; and this ring 10 is preferably provided with annular grooves 12 arranged on each side of the inlet-ports 11 and desirably constructed with an acute angle, as shown in Fig. V, to receive and retard the escape, if any, of the actuating medium from the ports, so as to constitute a fluid-packing between the ring 10 and the piston 8, thus reducing any liability of the escape of the impelling fluid around the periphery of the piston. The piston is to run free and out of contact with the stationary parts of the motor, to obviate the loss of any power by friction between said parts, and also to allow for greater expansion of the piston than the other parts. It is to be understood, however, that the construction of the piston and the parts which direct the steam or other impelling fluid to it is such that the liability of leakage is comparatively small, regardless of the presence or absence of said grooves.

Suitably secured upon the periphery of the piston are bands 13 which cover or serve as closures for the top of the buckets 9, between the inlets and outlets thereof and which overlap or project slightly over the inlets of said buckets, as shown in Fig. V, and form between them a slot or channel through which the steam or other impelling fluid passes into the buckets; and these bands 13 do not contact with the ring 10 or any other stationary parts, but a slight space is left between the bands 13 and the rings 10, which space is occupied by the steam-packing, as above described.

The inlets of buckets 9 are in the plane of ports 11 and are laterally very slightly larger than the said ports, so as to have substantially the same capacity for the expansive fluid and to permit the fluid moving at high velocity to enter these inlets without striking the sides of the slot aforesaid. The cover or closure bands 13 confine the fluid against outward movement, and the buckets being throughout, i. e. between the inlets and outlets, of as great a capacity, or preferably of a greater capacity, or cross-sectional area, than the said inlets, there is no back-pressure or back flow through the inlets.

The casing 2 is furnished with an inwardly projecting channeled ring 200, the channel or annular pressure chamber 201 of which forms the termination of the feed-pipe 3. The channeled ring 200 surrounds the stationary rings 10 to supply steam to the inlets 11 all around the piston.

Removably secured upon each side or edge of the channeled ring 200 and the ring 10, and extending inward to inclose the rim of the piston 8 at the opposite ends thereof is a stationary directing-ring or annular disk 14, preferably provided with vanes 15 inclined in the direction of the motion of the piston so that the actuating medium issuing from the outlets of the buckets 9, after having been reversed in direction by the parabolic formation of the buckets, will strike against the vanes 15; and these vanes will tend to direct the impelling-fluid, in its initial direction, (that is to say, in the direction given it by the tangential inlet-ports 11), against the vanes 16 of the inner compounding-disk 17 which is removably secured to and carried by the piston 8 as shown in Fig. V of the drawing.

If found desirable in practice, the directing-ring 14 may be provided with an annular internal rib or flange (not shown) to fit into an annular groove in the edge or side of the piston to prevent the escape of the actuating medium between the parts; and the directing-ring 14 is preferably provided with an annular groove 18 to receive an annular rib or flange 19 upon the inner disk 17 to prevent the escape of steam between the disk and directing-ring. The inner disk 17 is preferably provided with a concave or recessed central portion 20 and with an elongated hub 21, to receive the hub of the spindle 8, to facilitate the securing of the disk in position.

Removably secured over the inner disk 17 is an intermediate compounding-disk 22, preferably provided with a concave or recessed central portion 23, desirably constructed to enter the similar portion of the inner disk 17, and be secured in position by screws or other devices, substantially as shown in Fig. V; and the central portion 23 is preferably provided with vanes 24, inclined tangentially in a direction opposite to the line of motion of the piston, to receive the force of the actuating medium deflected against the same by the concave rim of the disk.

Secured over the intermediate disk 22 is an outer disk 25, preferably provided with tangential peripheral vanes 26, inclined in the line of motion of the piston, and constructed to receive the steam from the central portion of the intermediate disk 22, and finally discharge the same through ports 46 into the casing 2, from which it passes through the exhaust or outlet-nozzle 4, in the usual manner.

The regulating or valve device embodies a movable ring 27, preferably provided with openings 28, at predetermined positions, constructed to admit steam to the ports 11, or any of them, for the purpose of controlling the supply of steam to the piston, as shown in Figs. I and V.

In order to fit the valve-ring 27 closely upon the stationary inlet-port-ring 10 without danger of becoming tight from unequal expansion, said valve-ring 27 is preferably formed in two equal segments $a$, $b$, Fig. II, the ends of which are respectively furnished with projecting tongues 40, 41, which fit upon each other and the outermost tongue 41 is furnished with a slot 42 and the innermost tongue 40 is furnished with a stud 43 to fit in said slot and to project slightly above the tongue 41. 44 is a washer seated on the top of said stud and extending over the outer tongue 41, and 45 is a screw countersunk in said washer and screwed into the stud 43, thus to hold the tongue in place and yet allow perfect freedom of expansion and contraction of the valve-ring.

The valve-ring 27 may be regulated from the outside by means of a rocking-lever 29, Figs. I, II, III and V, pivotally mounted upon a stud or projection 30 upon the front-head 5 of the motor-casing; and links 31 are preferably pivoted to the ends of the lever 29 and have hinge connection with arms 32, Fig. III, which are fastened on the square ends of rock-shafts 33, working in stuffing-boxes or glands in the casing 2, and these rock-shafts 33 carry toothed segments 34 engaging teeth 35 upon the valve-ring 27. Therefore by vibrating the rocking-lever 29 in one direction, the valve-ring 27 will be turned to open all of the ports 11 of each group, as the openings 28 in the valve-ring 27 are brought into position to communicate with said ports 11; and the steam or other impelling fluid is thus admitted in greater or less volume to the piston 8. By a reverse vibration of said lever, one or more of the ports will be closed at the discretion of the operator, thus shutting off the impelling fluid as required. The teeth 35 are correspondingly arranged in opposite segments so that the ring segments $a$, $b$, are respectively operated upon by the toothed segments 34 of the valve-shafts 33. If found desirable in practice, the valve-ring may be provided with a plurality of internal projections constructed to be projected into the steam-ports, for the purpose of partially or entirely closing the same.

One or more of the compounding-disks may be omitted in practice if desired, although the employment of them all, as shown and described, is designed to utilize approximately all of the potency of the actuating medium.

The operation of the invention will be readily understood from the foregoing description, when taken in connection with the accompanying drawings, and the following explanation thereof. The course of the impelling fluid is indicated in Fig. I by differently barbed arrows. Loss of potential is understood by successively fewer barbs on said arrows. The actuating medium employed enters through the inlet-nozzle 3, as shown by the seven barbed arrows, the annular chamber 200 in the casing 2, from which, when the openings in the ring-valve register with the ports 11, it is directed into the buckets 9, in the piston 8, striking tangentially into the bottom thereof, and is turned laterally and discharged in an opposite direction, at the opposite ends of the piston upon the stationary vanes 15, of the stationary directing-ring 14, which vanes receive the reactive impact of the medium, and direct the same into its initial direction, against the revolving vanes 16 of the inner disk 17, to be a second time reversed in direction thereby, and projected against the concave rim of the intermediate disk 22, where the medium is directed toward the tangential vanes 24 thereof between which it passes, see Fig. XVI into the concave center of the intermediate disk, from whence the medium passes outwardly against the peripheral vanes 26 of the outer disk 25, and finally escapes through the peripheral ports 46 within the casing of the motor and out through the outlet-nozzle 4, in the usual way. With the inclination of the vanes 16, 24, and 26 shown in Figs. XV and XVI, it may be stated that in starting, the main effect will be produced on the first set of vanes 16, the effect on the vanes 24 and 26 being due to further deflection in the same rotative direction. But as the speed increases, the fluid will not be so fully deflected by vanes 16, and will exert more effect on vanes 24 and 26.

This invention is not confined to the use of steam as an actuating medium, nor is it limited to the specific construction, combination and arrangement of parts herein shown and described, and the right is reserved to make all such changes in and modifications of the same as come within the spirit and scope of the invention.

In order to eliminate from the motor the liability of friction caused by the unequal expansion of the inner and outer parts, the piston 8 and the stationary parts adjacent thereto are preferably made of metals such as iron and brass, respectively, having different degrees of expansibility under high temperatures so that the surrounding circular stationary parts which are of brass and are outside, and therefore more subject to radiation, will expand more than if made of iron, and the piston being inclosed in the case and not so subject to radiation, will heat to a higher temperature; but being of less expansibility than the brass-casing, it will expand more nearly in correspondence with said brass casing than if the piston were made of brass. Therefore the two different degrees of expansibility, by compensating each other, allow a closer fit to be maintained than would otherwise be possible.

It is to be understood that I do not limit myself to the use of iron and brass, but may use any metals which differ from each other in expansibility so as to afford the desired compensation referred to. Preferably the piston-bands 13 are made of steel. The annular chambers 50 and 51, respectively, formed between the disks 17 and 22 and between the disks 22 and 25, respectively, allow an expansion of the steam at those places where the change of direction of the steam occurs, and avoid any retarding effect of the steam being applied to the wheel at the times of such change of direction.

The buckets 9 are respectively formed in a forwardly depending mid-channel c which leads to the abutment d formed by the front wall of the rearwardly and outwardly extending lateral channels e. See Fig. IV. The steel bands 13 respectively cover the lateral channels e which flare outwardly so that the body of the wheel formed by the piston 8 and steel bands 13 has a series of oppositely opening ports forming opposite portions of the buckets, respectively. The impelling-fluid is admitted simultaneously into the mid-channels c all around the wheel and strikes the abutments d and thence presses on the forward walls of the buckets in its movement to escape laterally, thus impelling the wheel forwardly.

By securing the rings 13 to the piston they virtually become a part thereof and as the abutments d extend up between them substantially to their peripheries the channels or fluid receiving passages c extend from the periphery of the wheel inwardly and forwardly to direct the steam against the abutments d from which it passes rearwardly with reference to the direction of the rotation of the wheel through the duplicate branches or channels e, said branches being arranged substantially at right angles to each other. This construction and arrangement of the wheel or piston will cause the steam to be delivered in a very effective manner and will also divide or divert the steam equally to both sides of the wheel and thereby cause it to run with less vibration or lateral motion than would be the case if the steam were admitted to the periphery at the sides of the central plane or were not so equally divided, as in the latter case any variation in the steam pressure at different points of the periphery as the wheel rotated would cause a variation in the lateral pressure at those points, which, in turn would cause lateral motion of the wheel. In addition to this the covering of the outlets of the wheel radially with the rings will cause the outlets to be located in the side of the wheel at such a distance from the periphery as to better confine the steam in its passage from said outlets to the vanes 15. The importance of this will at once become apparent when it is remembered that the wheel must revolve with extraordinary velocity while subjected to the expansion caused by the heated steam, a wheel built in accordance with the foregoing having attained a velocity of 25,000 revolutions a minute.

The number of groups of inlet-ports in the stationary-port-ring 10 is preferably greater or less by one than the number of buckets in the piston 8, so that the abutments will not simultaneously pass the steam-inlets, but the transits of the abutments across the mouths of the inlets will be in succession.

Preferably, in starting the engine, the valve-ring will be thrown into position to fully open all of the inlet-ports, thus giving a full head of steam to overcome the inertia. When the engine is under movement, the valve-ring will be adjusted to admit just the amount of steam necessary to maintain the required speed under the load on the shaft 6. Such adjustment may be performed by hand, or by any form of well known governor, not shown, which can be connected by any available means to the lever 29. In moving this valve-ring 27 to close the ports in the stationary port ring, the larger ports 11 are closed first, as shown in Fig. I, and the valve ring as it is moved farther, progressively closes successively smaller ports.

Now having described my invention, what I claim as new and desire to secure by Letters-Patent of the United States is:—

1. A motor comprising a fluid-pressure chamber with ports, and a rotary piston having a peripheral channel opposite said ports, and provided with covered buckets having inlets opening from said channel and extending on opposite sides thereof.

2. A motor comprising a pressure chamber provided with ports, and a rotary piston provided with a series of peripheral buckets each having an inlet, and a band over said buckets on each side of the inlets.

3. A motor comprising a pressure chamber having ports adapted to deliver expansive fluid at a high velocity, a rotary piston having a central series of peripheral buckets, each comprising a forwardly inclined inlet and two rearwardly inclined outlets, said outlets being on opposite sides of their respective inlets, fixed vanes on each side of the said buckets, and vanes on the rotary piston to receive the fluid from said fixed vanes.

4. A motor comprising a pressure-chamber having ports adapted to deliver expansive fluid at a high velocity, a rotary piston having a central series of circumferential buckets each with an outlet on each side of its inlet, said outlets being at a distance from the periphery of the piston, fixed vanes on each side of said buckets and a plurality of series of vanes on the piston adapted to receive the fluid in succession after it leaves said fixed vanes.

5. A motor comprising a pressure chamber having ports adapted to deliver expansive fluid at a high velocity, a rotary piston having a central series of circumferential buckets with outlets on each side of their inlets, fixed vanes on each side of said inlets, a series of peripheral vanes on the piston on each side of the said fixed vanes, a deflecting means connected to the piston and adapted to direct inwardly the discharge from the last-named series of vanes, and an inner series of vanes on the piston adapted to receive such inwardly directed discharge.

6. A motor comprising a pressure-chamber having ports adapted to deliver expansive fluid at a high velocity, a rotary piston having a central series of circumferential buckets with outlets on each side of their inlets, fixed vanes on each side of said outlet, a series of peripheral vanes on the piston on each side of the fixed vanes, a deflecting means connected to the piston and adapted to direct inwardly the discharge from the last-named series of vanes, an inner series of vanes on the piston adapted to receive such inwardly directed discharge, an outer series connected to the piston, and means for directing to said outer series the discharge from the inner series of vanes.

7. A motor comprising a piston, a stationary ring having vanes, a disk carried by said piston and having circumferential vanes, a disk carried by said piston and having circumferential vanes, a disk upon the piston and having a concave rim and extended hub provided with vanes and a disk carried with the last mentioned disk and provided with vanes.

8. A piston for rotary engines comprising a cylindrical body, the periphery of which is provided with a series of abutments arranged centrally around the same, and rearwardly inclined channels leading from said abutments in opposite directions, the abutments projecting above the periphery and the channels increasing in area toward the outlet.

9. A motor provided with a casing and a piston constructed to move therein out of contact therewith, said casing having internal annular grooves on each side of the mid-plane thereof, each groove being provided with an acute angle, whereby the actuating medium is retained as a packing between said parts.

10. A motor comprising an annular pressure chamber having inside fixed ports arranged in groups and adapted to deliver expansive fluid, and a valve-ring having ports adapted to coöperate with the fixed ports.

11. A motor comprising an annular pressure chamber provided with inlet ports, a piston and a valve-ring constructed to partially or entirely close said openings, said ring being divided so as to fit the inlet ports more closely.

12. A motor comprising a pressure chamber provided with inlet ports arranged in groups, the ports of which groups are of various sizes, and valve-means constructed to progressively close the ports of successively smaller size.

13. A motor comprising a casing, a piston rotatably mounted therein, the periphery of which is provided with centrally arranged abutments and rearwardly inclined channels extending in opposite directions therefrom, bands around the piston, the inner edges of which are at a distance apart to form an annular space around the piston, and a ring around the bands provided with perforations to register with said space.

14. A motor provided with a casing having inlet-ports, a piston and a ring-valve formed in segments, screws fastening the segments together and working in slots, respectively, in the segments, whereby the ring-valve will become enlarged by the expansion of the parts.

15. A motor comprising a casing, a piston rotatably mounted therein, the periphery of which is provided with centrally arranged abutments and rearwardly inclined channels extending in opposite directions therefrom, bands around the piston, one on each side of said abutments, the inner edges of which are at a distance apart and each band overlaps the entrance to said channels, and a ring around the bands provided with perforations to register with the space between the bands.

16. A motor comprising a casing provided with an inwardly extending hollow projection, a piston rotatably mounted in the casing, the periphery of which is provided with centrally arranged abutments and rearwardly inclined channels leading in opposite directions therefrom, bands around the piston, one on each side of said abutments, the inner edges of which are at a distance apart, a centrally perforated ring around the bands, an annular disk secured to each side of the projection of the casing, each disk overlapping one edge of the piston, the band on that side and the ring, said disk being provided with deflector vanes, and a rotatable compounding disk beyond each annular disk, and provided with oppositely arranged deflector vanes.

In testimony whereof I have signed my name to this specification in the presence of two subscribing witnesses, at Los Angeles, California, this 21st day of January, 1901.

SOLOMON TOWNSEND HOLLY.

Witnesses:
CHARLES S. ROGERS,
JAMES R. TOWNSEND.